Jan. 29, 1963

G. KIPER

3,075,445

CAMERA SHUTTER ASSEMBLY

Filed Jan. 26, 1959

INVENTOR.
GERD KIPER
BY
Michael S. Striker
Attorney

Jan. 29, 1963

G. KIPER 3,075,445

CAMERA SHUTTER ASSEMBLY

Filed Jan. 26, 1959

INVENTOR.
GERD KIPER
BY Michael S. Striker
Attorney

Jan. 29, 1963  G. KIPER  3,075,445
CAMERA SHUTTER ASSEMBLY
Filed Jan. 26, 1959  3 Sheets-Sheet 3

INVENTOR.
GERD KIPER
BY Michael S. Striker
Attorney 3,075,445
CAMERA SHUTTER ASSEMBLY
Gerd Kiper, Munich, Germany, assignor to Agfa Aktiengesellschaft, Leverkusen, Bayerwerk, Germany
Filed Jan. 26, 1959, Ser. No. 788,890
Claims priority, application Germany Apr. 11, 1958
20 Claims. (Cl. 95—63)

The present invention relates to cameras, and more particularly to camera shutter assemblies.

In leaf shutter assemblies utilizing a system of shutter blades, the blades are moved into open and closed positions by sudden release of tension stored in biased spring means when the trigger or release means is actuated. In shutter assemblies operating with a single blade-actuating ring to which, as is known, all blades are pivotally connected, the relaxing of aforementioned spring means brings about a reciprocating movement of the ring whereby the blades are caused to move first into open and thereupon back into closed position. Similarly, if the shutter mechanism operates with two movable blade-actuating rings, the opening or closing of blades is brought about by releasing the tension stored in biased spring means to thereby move the rings consecutively in the same or opposing directions.

The kinetic energy necessary for opening and closing of shutter blades is supplied exclusively by the spring means during the latter's relaxation. During such energy exchange between the spring means and the means utilized for opening and closing of shutter blades, a certain amount of energy is lost due to friction. By disregarding such frictional losses in energy, it can be observed that the movements performed during opening and closing of shutter blades occur at a speed which increases (i.e. is directly proportional) with the increases in total energy that can be released by the spring means, as well as with the increases in the speed at which such total energy is being conveyed to the shutter mechanism.

The amount of work performed by the spring means, when released by the trigger mechanism, depends upon the force of the spring means and also upon the distance covered by the spring means during its relaxation, i.e. during its return into unstressed or unbiased position. When a standard extension or torsion spring with positive characteristics is utilized, its power is at a maximum immediately after release while the length of its movement into relaxed position, beginning with zero, increases only gradually. If, as is customary in known leaf shutters, the movements of various driving means, of the blade actuating ring or rings, and of the shutter blades begin simultaneously with the release of the spring means, the transformation of potential energy stored in the latter into kinetic energy requires a certain period of time. By this is meant that, if the spring means is so connected with various movable component parts of the shutter mechanism, e.g. with the blade-actuating ring or rings, that the movements of such component parts begin simultaneously with the movement of released spring means into relaxed position, at least the initial phase of such movements is a rather slow one. Accordingly, the initial phase of the movement of shutter blades into open and closed position is relatively slow.

The present invention is based on the recognition that, under similar operating conditions, the closing and openings of blades can be accelerated if the mechanism which directly controls their movements into such positions is operatively connected with the spring-biased driving means only at such time when a considerable amount of potential energy stored in the biased spring means is already transformed into kinetic or motional energy. Accordingly, an important principle underlying my invention is in that the ring or rings which should bring about movements of shutter blades into open and closed position be set in motion only at such times when the spring or springs controlling the rotation of such rings are already in motion, i.e. not immediately after the trigger mechanism has released the spring or springs to permit the latter's movement from tensioned or biased into relaxed position.

It is already known to bring about movements of shutter blades into open position by a mechanism which is actuated only at a time subsequent to release of the main driving or actuating means, normally connected with an extension spring, i.e. only after the main actuating element has already reached a certain velocity in its travel toward the position of rest. The disadvantage of such known systems is in that a reduction is attained only in time necessary for the opening of shutter blades while no accleration occurs while the blades return into closed position. In addition, the transfer of kinetic energy from the main actuating means to the shutter blade opening and closing means occurs with a considerable impact because the main actuating means is in motion while the mechanism directly controlling the movements of shutter blades is still motionless. Since the blade closing mechanism and the blades themselves are very sensitive, repeated impacts thereagainst often bring about damage and rapid wear and tear of the shutter mechanism.

An important object of the present invention is to provide an improved shutter assembly which is capable of rapidly opening and closing the blades in leaf shutters.

Another important object of the invention is to provide a leaf shutter assembly in which rapid movements of blades into closed or open position are brought about without appreciable impact upon any sensitive component parts of the mechanism.

A further object of the invention is to provide a shutter mechanism in which the opening and closing of blades are brought about by separate actuating and driving means.

A still further object of the invention is to provide a system of the above described character which is so constructed that the shutter blades remain in closed position when the separate actuating and driving means which bring about opening and closing of the blades are returned into operative position after an exposure of the film is made.

A yet further object of the invention is to provide a novel system for quickly opening and closing the blades in leaf shutter assemblies in which the separate driving means for effecting such opening and closing are controlled by a single trigger and/or arresting mechanism.

A concomitant object of the invention is to provide separate driving means for quickly opening and closing the blades in leaf shutter assemblies of the between-the-lens type, which are so combined and controlled that the opening and closing of the blades occurs in a desired sequence.

An additional object of the invention is to provide a novel system for quickly opening and closing the blades of leaf shutter assemblies which may be utilized in a great variety of cameras regardless of whether the blades are movable by one or two rings.

A still further object of the invention is to provide a system of just described characteristics which may be utilized with different types of shutter blades, such as those of the reciprocating type, of the unidirectionally rotating type, as well as in leaf shutters utilizing more than a single group of blades.

A yet further object of the invention is to provide a novel leaf shutter assembly for effecting rapid opening and closing of shutter blades which operates without impact upon the sensitive elements of the assembly, and which may be so combined with a timing or exposure time regulating device that the movements of actuating means for the blade opening and closing means may be controlled not only while, but also before, the blades are moved into open position.

The above and certain other objects of the invention are attained by the provision of separate spring biased driving means for effecting opening and closing of shutter blades. The separate driving means are preferably so connected with the blade-actuating means, i.e. one or two shutter rings, that the movements of blades into open and closed position are brought about only at such time when the respective driving means is already in motion, and preferably when such driving means has attained a considerable speed. The shutter ring or rings which, as is known, are directly connected with the blades in a leaf shutter assembly, are thus caused by the driving means to rotate at a considerable speed and to very rapidly effect opening and closing of the shutter blades. By rapid opening and closing of the blades is meant that the interval of time elpasing between the moment when the blades begin and complete the motion into closed or open position is extremely short.

An additional important feature of my invention is in that the driving means do not strike against the shutter ring or rings when the latter must be set in motion or brought to a halt. To that end, the two driving means preferably control the shutter ring or rings over a lug or pin and slot connection, the lugs being carried by and rotating with the driving means and being so guided in the suitably shaped open or closed cam slots of a single ring or in the slot of each of a pair of shutter rings that the movement of lugs is substantially tangential when the ring or rings are set in motion or brought to a halt.

According to a further feature of the invention, the shutter assembly may comprise a single arresting or locking means for both driving means, and the arresting means may be coupled with a timing mechanism to maintain the shutter blades in open position through a desired time interval and to thus determine the length of time during which the film is exposed.

The separate driving means are operated by resilient actuating means, e.g. extension or torsion springs; and means is provided for returning the actuating means into tensioned position when an operating cycle of the shutter assembly is completed. The means for tensioning or rewinding the actuating means are so installed as to avoid opening of shutter blades during winding, i.e. to prevent undesired exposure of the film in the camera on which the novel shutter assembly is mounted.

The arresting or locking means for both driving means may be released simultaneously, whereby the actuating means bring about simultaneous movements of respective driving means. In this modification of my novel shutter assembly, the arresting means may comprise a single lever with a pair of spaced noses or hooks which engage respective driving means in one position and simultaneously release both driving means when the lever is moved into another position. The driving means may be of discoid or cylindrical shape, and are formed with stop shoulders, stop pins, or the like, against which the noses of locking lever abut when the driving means are in locked position.

In order to bring about desired differences in exact times at which the blades are first moved into open and thereupon back into closed position, that driving means which effects closing of the shutter blades may be so installed as to travel over a greater distance before actually displacing the blades than the driving means which effects opening of the blades. Thus, even if both driving means are released simultaneously, the blades will be moved into open position and thereupon back into closed position at desired time intervals. Again, a timing mechanism may control the movements of that driving means which brings about the closing of shutter blades; thus, the time interval between opening and closing may be controlled within any desired range.

An important requirement for satisfactory operation of spring-actuated means for opening and closing the blades of a leaf shutter assembly is in that that blades should not reopen when the resilient actuating devices are returned into tensioned position to store sufficient potential energy for the next operating cycle. This may be achieved, according to the present invention, by the provision of swingable segmental gears which are connected with each actuating spring over suitable gear trains. A linkage may be provided to insure uniform tensioning of both actuating springs at least during the initial stage of the winding or tensioning operation, and to effect additional tensioning of one actuating means when the other actuating means is already under sufficient tension.

A very important advantage of my invention is in that the novel shutter assembly may reduce the length of film exposure because the blades are caused to move into open and closed positions at very high speeds. This, as explained hereinabove, is due to the fact that the driving means for opening and closing the blades are operatively connected with the blades only at such times when they are moved by respective actuating means at considerable speeds. Because the motion is imparted to all blades and to each blade-actuating ring without any appreciable impact, a longer useful life of all component parts is insured. In addition, the driving means, their resilient actuating means, the locking means therefor, and the winding means for the actuating means may be installed in many different types of cameras, whether utilizing one or more groups of shutter blades, and regardless of whether the blades are directly controlled by one or more shutter rings. Still further, many known types of timing mechanism may be combined with the novel shutter assembly to control the time span between the opening and reclosing of the shutter blades.

Since the masses of relatively small and lightweight driving means for opening and closing of shutter blades are negligible, the driving means can be rapidly accelerated to attain very high speeds at the time when they engage the blade-actuating ring or rings; accordingly, the transformation of potential energy stored in tensioned actuating springs for respective driving means into kinetic or motional energy is very rapid, and the movements of shutter blades not only into open but also into closed position require very short periods of time. The relatively small mass of driving means is also important because the rapidly rotating driving members, due to their negligible inertia, cannot impact with great force against the shutter ring or rings, and hence against the sensitive blades of the leaf shutter assembly. The connection between the blade-actuating ring or rings and both driving means is preferably such that the ring or rings are first rapidly accelerated at a constant and uniform rate to be thereupon decelerated again at a constant rate, whereby the transition between stillstand and motion as well as between motion and renewed stillstand of blade-actuating rings is a gradual one. The timing mechanism which controls the driving means for bringing about closing of the shutter blades may begin its control before or while the last mentioned driving means rotates the respective ring.

The feature that both driving means may be controlled by a single arresting or locking means is important insofar as it allows for further reduction in the mass and inertia of elements which must be moved to effect opening and closing of shutter blades and, consequently, an even more rapid opening and closing movement of blades is made possible.

The novel features which are considered as characteristic for the invention are set forth in particular in the appended claims. The invention itself, however, both as to its construction and its method of operation, together with additional objects and advantages thereof, will be best understood from the following description of certain specific embodiments when read in connection with the accompanying drawings, in which:

Figure 1:
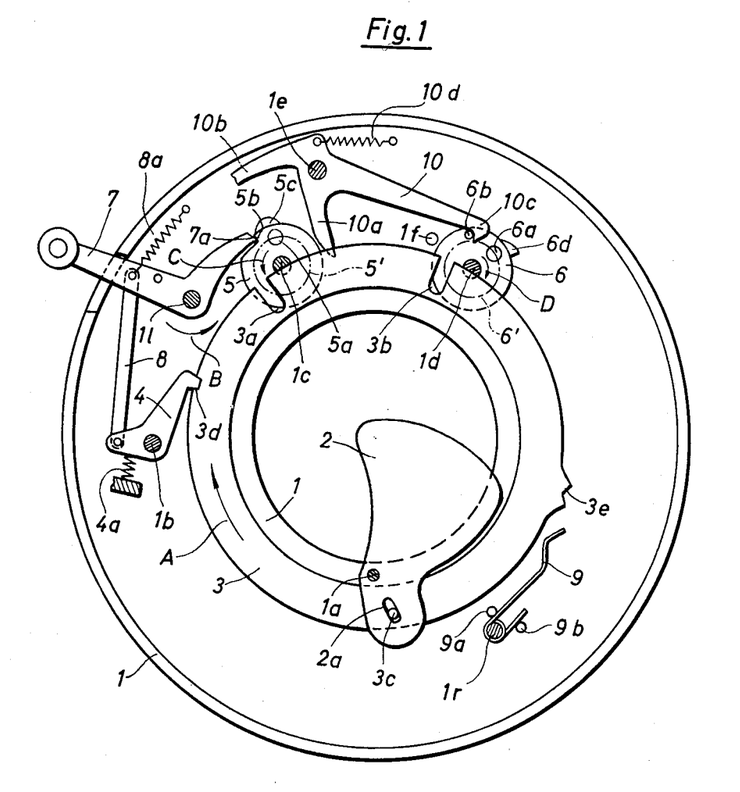
FIG. 1 is a schematic front elevational view of one form of the improved shutter blade opening and closing assembly, a single shutter blade being shown in closed position and certain parts being broken away for the sake of clarity.

Referring now in greater detail to the drawings, and first to FIG. 1, there is shown a leaf shutter mechanism which comprises a single group of blades 2. Only one blade is shown for the sake of clarity, and also because the movements and mounting of other blades are analogous. Blades 2 are moved into closed (as shown) and open positions by a single shutter ring 3 which latter is concentric with and rotatable about the axis of the shutter housing or casing 1. Each blade is pivotally mounted on a pin 1a fixed to the tubular casing 1 at a point adjacent to the inner annular surface of ring 3, and is caused to pivot about member 1a by the ring 3 whose stud or pin 3c extends into an elongated closed slot 2a formed in an outwardly extending ear of the respective blade 2. When the ring rotates clockwise in the direction indicated by arrow A, the blades are moved into open position, and are returned into positions similar to the full-line position of blade 2 when the ring 3 rotates in anticlockwise direction. In their respective open and closed positions, the blades 2 expose and cover, respectively, the central opening in the casing or housing 1.

Ring 3 receives motion in clockwise and anticlockwise direction by a pair of driving members 5, 6, respectively, whose respective driving lugs 5a, 6a may extend into spaced open radial cam slots or cutouts 3a, 3b, respectively, formed in the peripheral zone of ring 3. The movements of lugs 5a, 6a into and out of respective cutouts 3a, 3b are in substantially tangential directions. When in blade-closing position, ring 3 is arrested by a pawl 4 which latter is pivotally mounted on a pin 1b fixed to the casing 1 externally of member 3. This last-mentioned member is formed with a peripheral recess or notch 3d into which the nose of pawl 4 may extend.

Ring 3 may be caused to move in clockwise direction indicated by arrow A into blade-opening position by a trigger or release lever 7 mounted on a pivot pin 1l fixed to housing 1 and connected to one arm of pawl 4 by a coupling rod or link 8. Trigger 7 is shaped as a rocker arm whose longer arm is connected to link 8 and is biased in clockwise direction by an extension spring 8a. The arresting or locking arm of trigger 7 is formed with an end portion or nose 7a which abuts against a shoulder 5b formed in the peripheral zone of driving member 5. Pawl 4 is biased in clockwise direction by an extension spring 4a.

When the outwardly extending longer arm of trigger 7 is rotated about pin 1l in anticlockwise direction indicated by arrow B, the end portion or nose 7a is moved away from shoulder 5b, and the pawl 4 simultaneously moves out of recess 3d to permit clockwise advance of shutter ring 3 under the influence of driving member 5, and more particularly under the influence of the lug 5a when the latter rotates in anticlockwise direction indicated by arrow C about the shaft 1c fixed to housing 1. The arrangement is such that the ring 3 is released by lock pawl 4 simultaneously with the release of driving member 5 by the portion or nose 7a on the locking arm of trigger 7. However, the ring 3 is set in motion only after elapse of a certain time interval because, and as clearly shown in FIG. 1, the driving lug 5a is located at some distance from slot 3a when the shoulder 5b and end portion 7a abut against each other. Thus, lug 5a must perform a certain angular movement in the direction of arrow C before reaching the surfaces of ring 3 which surround the cutout or open slot 3a. Driving member 5 is rotatable by a tensioned spring which has been omitted in FIG. 1 for the sake of clarity.

Driving member 6 for rotating the ring 3 in anticlockwise direction is mounted on a shaft 1d, fixed to casing 1, for rotation in clockwise direction indicated by arrow D. The resilient actuating means which brings about angular movements of second driving member 6 is also omitted in FIG. 1 for the sake of clarity.

As mentioned hereinabove, ring 3 and driving member 5 may be released simultaneously by lock pawl 4 and the locking or arresting arm of trigger 7, respectively, when the latter is swung about pivot pin 1l in the direction of arrow B. The non-represented resilient actuating means is hereupon free to rotate driving member 5 and its lug 5a in the direction of arrow C whereby the latter, upon attaining the desired angular speed, enters the cutout 3a and engages the right-hand surface surrounding the cutout 3a to advance the ring 3 in clockwise direction indicated by arrow A. Since the inertia of cylindrical or discoid driving member 5 is negligible, the latter is rapidly accelerated by its resilient actuating means which is free to expand, uncoil or otherwise return into unstressed condition as soon as the portion or nose 7a of trigger 7 moves away from shoulder 5b. Thus, the potential energy stored in the actuating spring of driving member 5 is rapidly transformed into kinetic energy, and the lug 5a enters the radial slot 3a at a considerable speed in substantially tangential direction. The path of lug 5a is indicated in FIG. 1 in phantom lines 5'. Because the lug 5a enters into radial slot 3a in substantially tangential direction, the contact between ring 3 and lug 5a is practically without impact and the blades 2 are moved into open position without any shock or jolt whatever. As soon as the lub 5a comes into contact with the right-hand surface of ring 3 in the latter's cutout 3a (i.e. at a point where the phantom-line circle 5' denoting the path of lug 5a intersects the solid contour line of ring 3 in cutout 3a), the shutter ring is immediately and very rapidly accelerated up to such time when the lug 5a reaches its innermost position in cutout 3a in which the radial center line of cutout 3a intersects the axis of shaft 1c. Thereupon, the deceleration of ring 3 begins while the lug 5a travels in cutout 3a toward the latter's open end to leave the cutout again in substantially tangential direction. The ring 3 is gradually brought to a standstill without any impact or shock whatever. It will be readily understood that the distance between and relative positions of pins 1a and 3c, as well as the distance between shaft 1c and lug 5a, is so chosen that the shutter blades 2 are moved into fully open position when the lug 5a performs a full or partial revolution about shaft 1c. The angular movement of ring 3 in the direction of arrow A, while the lug 5a enters and again leaves the cutout 3a, is such as to move blades 2 into open position to permit controlled exposure of the film in a camera on which the shutter assembly is mounted. Ring 3 is then maintained in blade-opening position by resilient means in the form of a leaf spring 9 whose suitably deformed end portion enters a recess or notch 3e in the periphery of member 3. Spring 9 is coiled about a stud 1r, fixed to housing 1, and is held under tension by a pair of spaced pins 9a, 9b. This spring releaseably locks shutter ring 3 in blade-opening position up to such time when the lug 6a of second driving member 6 enters the open slot 3b to return the ring 3 into the position of FIG. 1, i.e. anticlockwise. Of course, when the ring 3 is releasably held by spring 9 extending into recess or notch 3e, its cutout 3b is in the phantom-line path of lug 6a which latter rotates in the direction of arrow D.

Driving member 5 carries on its periphery a projection or cam 5c which, as soon as the lug 5a emerges from cutout 3a, i.e. after the ring 3 is brought to a standstill in blade-opening position, engages and tends to pivot the arm 10a of a three-armed lever 10. This lever is pivotable about a pin 1e, fixed to housing 1, and is constantly biased in clockwise direction by an extension spring 10d. An arm 10b of lever 10 cooperates with a timing or exposure regulating mechanism (not shown) which controls the time of film exposure. Depending upon the setting of the timing mechanism, the pivoting of lever 10 under the influence of projection or cam 5c occurs after elapse of a predetermined period of time. In other words, lever 10 cannot be pivoted by projection or cam 5c before the timing mechanism has released the arm 10b. As soon as the lever 10 is pivoted in anticlockwise direction, i.e. against the force of resilient means 10d, its arresting arm 10c releases a stop pin 6b which is connected to second driving member 6, and thus enables the non-represented actuating spring to bring about angular movement of driving member 6 and of its lug 6a in the direction of arrow D. As before mentioned, the lever 10 is pivoted into a position in which it releases the driving member 6, by the projection or cam 5c of driving member 5, and only at such time when the blades 2 are in open position, i.e. when the cutout 3b is in the path 6' of lug 6a. The action of lug 6a upon the ring 3 to return blades 2 into closed position is analogous to the above-described action of lug 5a on driving member 5. Thus, lug 6a enters the cutout 3b in a tangential direction and engages, without any appreciable impact, the left-hand surface of ring 3 in cutout 3b to thereupon accelerate the shutter ring up to such time when the radial center line of cutout 3b intersects the axis of shaft 1d. Thereupon, a gradual deceleration of ring 3 begins, and the latter is arrested when the lug 6a leaves the slot 3b, again in tangential direction and hence without bringing about any jerky motion of shutter blades 2 and of ring 3. The blades 2 are now returned into closed position of FIG. 1, and the cutout 3a is returned into the path 5' of lug 5a. It will be noted that the lug 6a, after release of stop pin 6b by the arresting arm 10c of lever 10, describes a certain angular movement before reaching the open end of cutout 3b; therefore, as the mass of driving member 6 is insignificant, the latter is rapidly accelerated by its non-represented actuating spring means and brings about rapid return movement of shutter ring 3 into blade-closing position.

Figure 3:
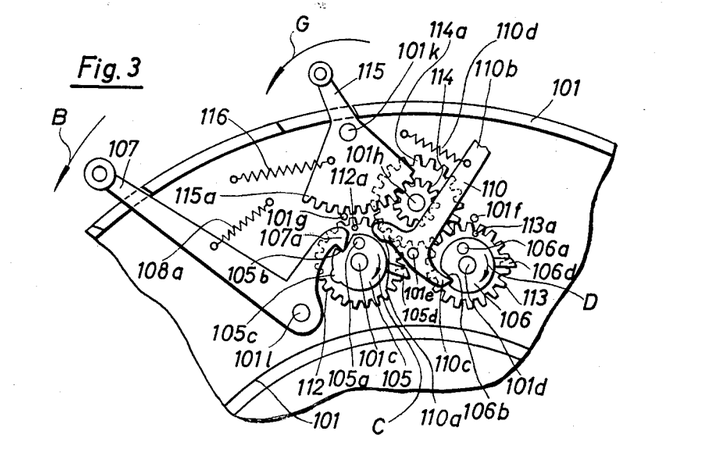
FIG. 3 illustrates in fragmentary view a cocking or tensioning mechanism for the assembly shown in FIG. 2.

As soon as the lug 6a emerges from slot 3b, a projection or nose 6d of driving member 6 comes into abutment with a stop pin 1f, fixed to housing 1, and prevents further rotation of driving member 6. The rotation of driving member 5, upon emergence of lug 5a from cutout 3a, can be arrested in similar fashion, as is shown in FIG. 3, the projection and stop pin analogous to elements 6d and 1f, respectively, having been omitted in FIG. 1 for the sake of clarity.

When the projection 6d abuts against the stop pin 1f, recess or notch 3d is returned into the position in which it can receive the nose of lock pawl 4, which latter thus arrests and maintains the ring 3 in blade-closing position. The blade opening and closing cycle is now completed.

It will be noted that the means for tensioning the non-represented resilient actuating means for driving members 5, 6, too, are not shown in FIG. 1. Such winding or tensioning means may assume a considerable number of different shapes. For example, it is possible to consecutively rotate driving members 5 and 6 back into their respective starting positions of FIG. 1 in directions opposed to those indicated by arrows C, D, respectively. By so rotating driving members 5 and 6, sufficient potential energy is stored in their actuating springs to bring about a new blade opening and closing cycle upon release of ring 3, driving member 5 and driving member 6 by locking or arresting parts 4, 7a and 10c, respectively. However, since the blades 2 would necessarily move back into open position if the driving member 6 were rotated in anticlockwise direction, a second group of blades would become necessary to prevent undesired exposure of the film during such return movement of driving members 5 and 6. If it is desired to operate without a second group of shutter blades, the lugs 5a, 6a may be made of a resilient material so as to yield while moving along the adjacent portions of shutter ring 3 which latter is then held in locked position by its lock pawl 4. The resiliency of lugs 5a, 6a may be such that they will positively rotate shutter ring 3 when the latter is not locked by pawl 4, but will yield and become deformed while moving against and along the ring when the latter is in locked position.

Figure 2:
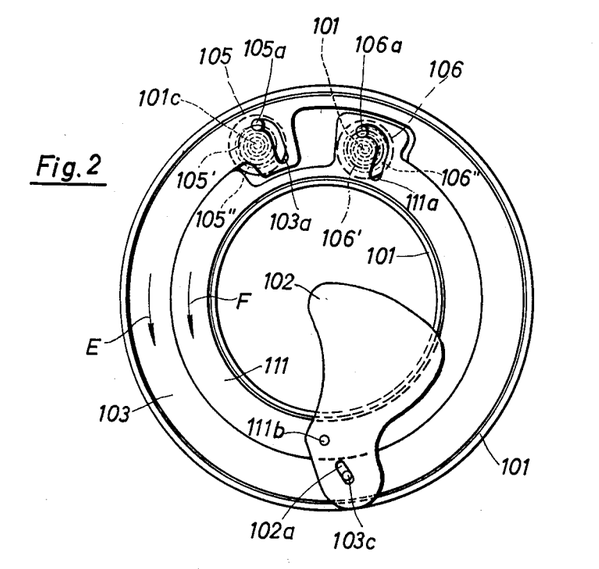
FIG. 2 illustrates a modification of the assembly shown in FIG. 1, certain parts shown in FIG. 1 being omitted, also for the sake of clarity.

FIG. 2 illustrates a modification of the shutter assembly shown in FIG. 1. A group of shutter blades 102 (again only one shown for the sake of clarity) is movable into open and closed positions by a pair of shutter rings 103, 111, both of which are mounted for rotational movements about their common axis which coincides with the optical axis of the camera and with the axis of housing or casing 101. The directions in which the rings 103, 111 rotate are indicated by arrows E, F, respectively; thus both rings rotate anticlockwise when the shutter blades 102 are moved first from closed into open position (ring 103) and thereupon back into closed position (ring 111).

Each blade 102 is pivotally connected to second ring 111 by a pivot pin 111b, and receives in its elongated closed slot 102a a pin 103c fixed to the outer ring 103. Driving members 105, 106 for rings 103, 111, respectively, are rotatably connected to housing 101 by respective shafts 101c, 101d. Lugs 105a, 106a of respective driving members 105, 106 extend into closed cam slots 103a, 111a formed in rings 103, 111, respectively. The configuration of cam slots 103a, 111a is such that the respective driving member 105, 106 does not immediately bring about rotational movement of ring 103 or 111 when caused to rotate about its shaft 101c or 101d, but only at such time when its stud 105a or 106a enters the radial or inner portion of respective slot 103a, 111a. The curvature of outer or arcuate portions of slots 103a, 111a corresponds to the curvature of circular paths 105', 106' in which the respective lugs 105a, 106a travel about shafts 101c, 101d, respectively. Thus, when the trigger 107 (see FIG. 3) is swung about its pivot pin 101l in the direction of arrow B, its nose 107a is moved away from shoulder 105b in the periphery of driving member 105, and the latter is free to rotate in the direction of arrow C. As before stated, ring 103 remains stationary while the lug 105a travels in its phantom-line circular path 105' in the outer or arcuate portion of slot 103a. The driving member 105, whose mass and hence resistance to acceleration are insignificant, rapidly attains a high angular speed and causes the lug 105a to bring about movement of ring 103 in the direction of arrow E as soon as the lug 105a enters the radial or straight portion of cam slot 103a. Here, too, lug 105a enters the radial portion of slot 105a in substantially tangential direction and thus brings about angular displacement of ring 103 without any jolt or impact upon ring 103 and also upon blades 102. The blades begin to move into open position. Ring 103 first advances at a rapidly increasing speed up to such time when its own axis is in a common plane with the axes of lug 105a and shaft 101c. Thereupon, the speed of ring 103 begins to decrease, and the ring is brought to a halt in a position in which the center line of the radial portion of slot 103a is tangential to the left-hand side of phantom-line circular path 105' in which the lug 105a advances. Thus, the extent of displacement of ring 103 in the direction of arrow E, measured along a circle passing through the axis of shaft 101c, equals the diameter of the phantom-line path 105' of lug 105a. In such position of shutter ring 103, the blades 102 are open and the exposure of the film begins.

Referring now to FIG. 3, it will be noted that the shutter rings 103, 111 have been omitted to reveal the cocking or winding mechanism for the shutter assembly of FIG. 2, which cocking mechanism, however, can also be utilized in the shutter assembly of FIG. 1. The position of driving members 105, 106 in FIG. 3 corresponds to that of FIG. 2, i.e. the blades 102 are in closed position. It will be seen that, upon pivotal movement of trigger 107 in the direction of arrow B, driving member 105 describes the aforementioned angular movement in the direction of arrow C and thereby entrains the projection or cam 105c into contact with the arm 110a of lever 110 which latter is pivotably mounted on a pin 101e. The arm 110b of lever 110 cooperates with a non-represented timing mechanism. Thus, depending upon the setting of such timing or film exposure regulating mechanism, projection or cam 105c pivots the lever 110 after elapse of a shorter or longer period of time whereby the end of arresting means 110c, which latter constitutes the third arm of lever 110, moves away from a stop shoulder 106b in the periphery of driving member 106. This second driving member is now free to rotate in the direction of arrow D to move its lug 106a first through the arcuate portion of slot 111a in second ring 111. Since the curvature of the arcuate or outer portion of slot 111a corresponds to the curvature of the phantom-line circle 106' in which the lug 106a advances, the second ring 111 remains stationary until such time when the lug 106a reaches the radial or inner portion of cam slot 111a. Thus, as the inertia of driving member 106 is negligible, the latter is accelerated while its lug 106a moves in the arcuate portion of slot 111a, and rotates at a rather high angular speed when its lug 106a enters the inner or radial portion of said slot in substantially tangential direction. In other words, the center line of the radial portion of slot 111a is tangential to the phantom-line circuit 106' in which the lug 106a advances.

It will be noted from the position of projection or cam 105c in FIG. 3 that the ring 103 can perform an additional but relatively short angular movement as soon as the projection or cam 105c is free to advance past the lifted arm 110a of lever 110 until a radial stud or projection 105d of driving member 105 comes into abutment with a stop pin 101g which latter is fixed to the housing or casing 101. While the driving member 105 performs the just described last leg of its travel into the position in which its projection or stud 105d abuts against the stop pin 101g, the lug 106a is already free to advance in the direction of arrow D and, after entering the radial portion of slot 111a, first accelerates and thereupon retards the second ring 111 in the direction of arrow F. The configuration of cam slot 111a is such that the ring 111 begins and ceases to move in anticlockwise direction indicated by arrow F without any appreciable impact thereagainst by lug 106a, i.e. the movements of lug 106a in slot 111a at the time when the rotation of ring 111 begins and ceases are in substantially tangential directions. The movement of ring 111 ceases when the center line of the radial portion of slot 111a is tangential to the left-hand side of phantom-line circle 106' representing the path of lug 106a in FIG. 2.

The angular movement of second driving member 106 about shaft 101d is arrested when the projection or stud 106d comes into abutment with the stationary stop pin 101f. The shutter blades are now again in closed position corresponding to that of blade 102 in FIG. 2.

The actuating springs 105", 106" which bring about angular movements of respective driving members 105, 106 in the direction of arrows C, D, respectively, may be tensioned by a winding or tensioning mechanism which is illustrated in FIG. 3. Resilient actuating means 105", 106" are shown as torsion springs. The tensioning mechanism comprises a winding or cocking lever 115 which is pivotable about a pin 101k, fixed to casing 101, and is constantly biased in clockwise direction by an extension spring 116. Lever 115 comprises a gear segment 115a which meshes with a gear 114 mounted on a pivot pin 101h. A larger gear 114a is also mounted on pin 101h and is rigidly connected to gear 114; thus, when the lever 115 is swung about pin 101k in the direction of arrow G, gears 114 and 114a rotate in unison about pin 101h in clockwise direction. Gear 114a meshes with gears 112, 113 which are mounted for rotation about shafts 101c, 101d, respectively, i.e. coaxially with respective driving members 105, 106. Studs or entraining means 112a, 113a are connected to gears 112, 113, respectively, which latter are freely rotatable on their respective shafts 101c, 101d so that the studs 112a, 113a come into abutment with radial projections 105d, 106d when the gears 112, 113 are caused to rotate in anticlockwise direction by the segment 115a of winding lever 115 over gears 114 and 114a, it being assumed that the lever 115 is swung about pin 101k in the direction of arrow G.

It should be kept in mind that FIG. 3 illustrates driving members 105, 106 in a position in which their respective actuating or rotation-imparting springs 105", 106" are already under tension. The winding lever 115, of course, is actuated when the radial projections 105d, 106d are in abutment with stop pins 101g, 101f, respectively, i.e. in immediate proximity of studs 112a and 113a. As soon as the winding lever 115 is swung in the direction of arrow G, studs 112a, 113a immediately engage radial members 105d, 106d, respectively, and bring about rotation of respective driving members 105, 106 in directions counter to those indicated by arrows C, D, respectively. While the driving members are so rotated, their actuating springs 105", 106" are brought under tension, i.e. these springs store sufficient potential energy to bring about the opening and closing of blades 102 in a subsequent operating cycle. Levers 107, 110 are constantly acted upon by respective extension springs 108a, 110d; therefore, as soon as the winding lever 115 returns driving members 105, 106 into the position of FIG. 3, the nose 107a and the end of arresting arm 110c immediately engage shoulders 105b, 106b, respectively, and arrest both driving members in such positions in which their respective actuating springs 105", 106" are under tension. Winding lever 115 can be released to return into the position of FIG. 3 under the influence of its resilient member 116. When the winding lever 115 is in the position of FIG. 3, studs 112a, 113a are in such position that they cannot impede angular movements of radial projections 105d, 106d, respectively, while the driving members rotate clockwise to advance rings 103, 111 in anticlockwise directions of arrows E, F, respectively, i.e. to first open and to thereupon reclose the shutter blades 102. During rotation of driving members 105, 106 under the influence of members 112a, 113a, respectively, rings 103, 111 rotate in clockwise direction at such speed that the position of closed blades with respect thereto remains unchanged. In other words, while rotating in anticlockwise direction during the tensioning of their respective actuating springs 105", 106", the rings 103, 111 do not change their positions with respect to each other.

Figure 4:
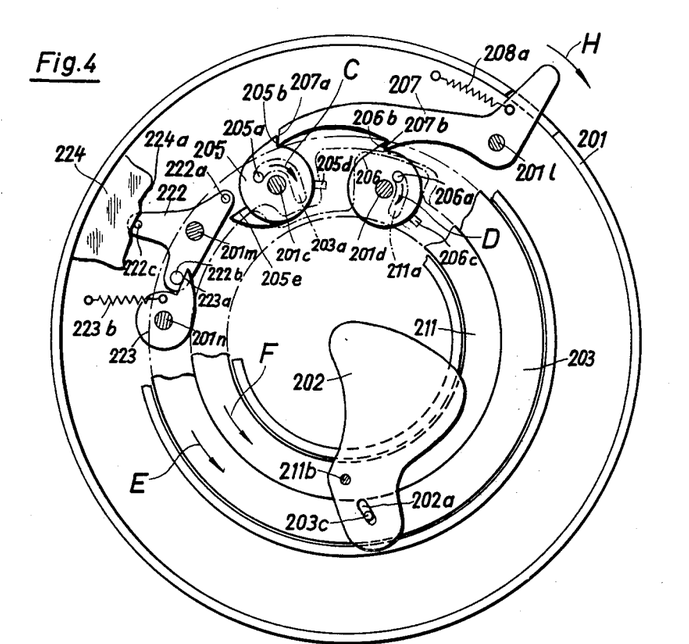
FIG. 4 is part elevational and part sectional view of a further modification showing the driving means in cocked or spring-biased position.

Referring now to the embodiment of FIG. 4, there is shown only one of a group of blades 202, each blade being pivotally mounted on a pin 211b fixed to the inner blade-actuating shutter ring 211, and receives in its elongated closed slot 202a a pin 203c which latter is fixed to the outer ring 203. Rings 203, 211 are coaxial with and rotatable about the axis of housing or casing 201. In FIG. 4, the sole blade 202 is shown in closed position.

Ring 203 is rotatable in the direction of arrow E by a driving member 205, and a similar second driving member 206 is adapted to rotate the second shutter ring 211 in the direction of arrow F. Driving members 205, 206 are rotatable about shafts 201c, 201d, respectively, which latter are fixed to the housing 201. Rotation of members 205, 206 may be brought about by a pair of non-represented resilient actuating means, e.g. two torsion springs analogous to members 105", 106" shown in FIG. 2.

It will be noted that, in order to reveal the driving members 205, 206, the upper halves of rings 203, 211 are broken away and that the contours of their broken-away portions are shown in phantom lines. As in the embodiments of FIGS. 1 and 2, driving members 205, 206 carry lugs 205a, 206a, respectively, which extend into respective closed cam slots 203a, 211a of blade-actuating rings 203, 211, respectively. In the position of FIG. 4, the non-represented actuating springs of driving members 205, 206 are under tension, i.e. both driving members are ready to rotate respective rings 203, 211 in the direction of arrows E, F. The actuating springs of driving members 205, 106 are held in tensioned position by a trigger or release lever 207 which latter is pivotably mounted on a pin 201l. Pin 201l is fixed to casing 201, and an extension spring 208a also anchored to casing 201, constantly biases lever 207 in anticlockwise direction. Lever 207 is formed with a pair of noses 207a, 207b which abut against the stop shoulders 205b, 206b formed in the peripheral zones of driving members 205, 206, respectively.

The assembly of FIG. 4 further comprises a timing mechanism for controlling the time of film exposure, represented only by a pawl 223, a lever 222 and a cam or control member 224. Pawl 223 is mounted on a stationary pivot pin 201n which latter is fixed to the housing 201. An extension spring 223b constantly biases pawl 223 in anticlockwise direction. The flat surface 223a on the nose of pawl 223 abuts against a pin or follower 222b which is mounted on one arm of the three-armed sensing or key lever 222. A second pin or follower 222c on another arm of lever 222 abuts against a stepped cam surface 224a of the exposure regulating or controlling member 224. Lever 222 carries on its third arm a further pin 222a which may abut against the cam surface 205e defined by a cam-shaped extension of driving member 205.

When the lever or trigger 207 is swung about pin 201l in the direction of arrow H, an operating cycle of the shutter assembly begins because both noses 207a, 207b are practically simultaneously moved away from contact with stop shoulders 205b, 206b, respectively. The means for pivoting the lever 207 is not shown in the drawings. The driving members 205, 206 are now free to rotate under the influence of their respective non-represented actuating springs whereby the driving lug 205a advances in cam slot 203a in the direction of arrow C, while the driving lug 206a travels in the slot 211a of ring 211 in the direction of arrow D.

It will be noted that the cam slot 211a comprises a relatively short arcuate or outer portion, i.e. the lug 206a rapidly enters into the longer inner or radial portion of its cam slot 211a to bring about rotation of ring 211 in the direction of arrow F, whereby the blades 202 are moved into open position. While moving into open position, each blade performs a composite movement about its pin 211b and also about its pin 203c which latter then slides in the respective slot 202a.

Driving member 205, which begins its rotation in the direction of arrow C simultaneously with driving member 206, causes its lug 205a to travel in the relatively long outer or arcuate portion of slot 203a in shutter ring 203. The length of outer or arcuate portion of slot 203a is so selected that the lug 205a reaches the radial or inner portion of said slot only at such time when the blades are already in open position, i.e. after the lug 206a has already reached its end position in the radial portion of slot 211a. Such retarded rotative action by lug 205a upon ring 203 occurs even if the driving member 205 is not retarded by the timing mechanism 222—224, i.e. even if the non-represented actuating spring of driving member 205 is free to rotate the latter simultaneously with removal of nose 207a away from stop shoulder 205b. However, if the positioning of member 224 is such that the retarding or stop pin 222a abuts against or is in the path of the cam surface 205e of driving member 205 when the latter is in its locked position of FIG. 4, member 205 is retarded until such time when the force of its actuating spring causes the pin 222a on lever 222 to move out of the path of surface 205e. Such movements of pin 222a occur against the force of relatively weak spring 223b which latter, by causing the pawl 223 to abut against the follower or pin 222b, constantly tends to pivot the sensing lever 222 in a clockwise direction. At the same time, spring 223b causes the follower 222c to remain in continuous contact with the surface 224a of control member 224. In this manner, the rotation of driving member 205 may be retarded for a desired period of time whereby the length of film exposure may be adjusted to any desired value. The rotation of second driving member 206 is entirely independent from the rotation of driving member 205; therefore, any retardation of rotational movement performed by driving member 205 affects only the length of film exposure but not the movement of shutter blades 202 into open position.

Figure 5:
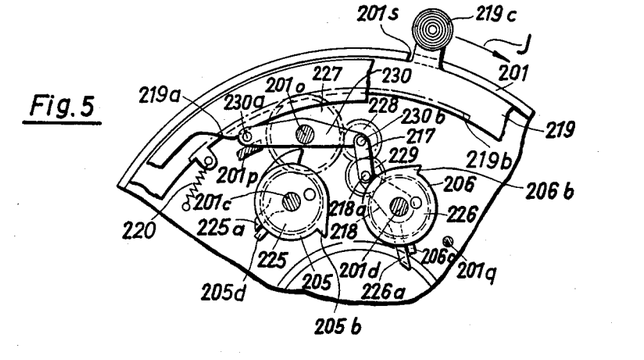
FIG. 5 is a fragmentary view of a cocking mechanism for the actuating means utilized in the assembly shown in FIG. 4.

When the non-represented actuating springs of driving members 205, 206 are returned into tensioned position, e.g. by a winding mechanism of the type shown in FIG. 5, it is advisable to rotate both driving members at a uniform angular speed at least while the lugs 205a, 206a are still in the radial portions of cam slots 203a, 211a, respectively. This prevents undesirable opening of blades 202 during the winding of actuating springs. The winding or tensioning mechanism of FIG. 5 is shown in an intermediate position, and represents but one of many systems capable of tensioning the actuating springs of driving members 205, 206 without bringing about undesirable movements of blades 202. A winding or cocking ring 219 is formed with an internal toothed segment 219b and is coaxially rotatable with respect to casing 201. Ring 219 also comprises a knob or handgrip member 219c which extends outwardly from the housing 201. The tensioning of actuating springs for driving members 205, 206 occurs while the handgrip member 219c is moved in the direction of arrow J. A gear 227, mounted for rotation about a stationary pin 201o, meshes with gear segment 219b, as well as with gears 225 and 228, the latter two rotatably mounted on shaft 201c and pin 230b, respectively. Gear 225 is rotatable about shaft 201c with respect to driving member 205, and carries a radially extending projection 225a which may be brought into abutment with the radial stud 205d of driving member 205 when the gear 228 is rotated by winding ring 219 over train 219b, 227.

Pin 201o supports a two-armed lever 230 which latter is rotatable thereon with respect to gear 227. One arm of lever 230 carries the aforementioned pivot pin 230b for gear 228, while its other arm carries a follower 230a. To the pivot pin 230b is connected one end of a short link 217; the other end of this link is swingable about a pin 218a carried by the free end of a one-armed lever 218 whose other end is rotatably mounted on the shaft 201d of second driving member 206. The shaft 201d also supports a gear 226 which may be rotated by winding ring 219 over train 219b, 227, 228 and a further gear 229, the latter mounted for rotation on pivot pin 218a. Gear 226 carries a radial projection 226a which may be brought into abutment with radial stud 206c of second driving member 206.

The follower 230a of lever 230 is in contact with an arcuate cam 219a of winding or tensioning ring 219. A stop 201p in the path of follower 230a prevents lever 230 from pivoting about its pin or shaft 201o in anticlockwise direction. This insures rotation of gear 226 when the winding ring 219 rotates in the direction of arrow J. Since the length of slot 211a is shorter than that of slot 203a, the second driving member 206 is returned by gear 226 into its initial position of FIG. 4 before the other driving member 205. The end portion of projection 226a, which is longer than the radial stud 206c, comes into abutment with a stop 201q at the same time when the outwardly curved surface of cam 219a moves along follower 230a which latter then brings about pivotal movement of lever 230 about pin 201o so that the gear 229 travels in an arc about the now stationary gear 226 which latter is arrested by its projection 226a abutting against the stop 201q. While the lever 230 pivots about its pin 201o, link 217 and lever 218 also perform angular movements about members 230b and 218a, and 218a and 201d, respectively, and the gear 227 continues to rotate gear 225, thus enabling projection 225a to complete the tensioning of the actuating spring for driving member 205, the projection 225a entraining stud 205d and rotating driving member 205 until the nose 207a of trigger 207 (see FIG. 4) returns into abutment with the stop shoulder 205b. At the same time, nose 207b returns into abutment with the stop shoulder 206b of second driving member 206, and the shutter assembly is ready for the next operating cycle which may begin immediately upon release of handgrip member 219c to enable an extension spring 220 to return the winding ring 219 into its illustrated position. The extent to which ring 219 may be moved by spring 220 in a direction opposed to that indicated by arrow J is controlled by a stop shoulder 201s defined by the casing 201, against which the handgrip member 219c abuts.

Gear segment 219b is in constant mesh with gear 227 and, hence, any movement of ring 219 in the direction of arrow J immediately brings about rotation of driving members 205, 206 in directions opposed to those indicated in FIG. 4 by arrows C, D, respectively.

In addition, segment 219b returns the lever 230, link 217, lever 218 and gear 225 into their respective initial or idle positions; therefore, radial projections 225a and 226a are angularly displaced in directions away from respective studs 205d, 206c and do not impede rotation of driving members 205, 206 when the trigger 207 is swung in the direction of arrow H to start another operating cycle of the leaf shutter assembly.

During the winding of actuating springs for driving members 205, 206, rings 203, 211 rotate in clockwise directions without changing their positions with respect to each other. Thus, the closed position of blades 202 remains unchanged though the blades are angularly displaced with respect to the axis of housing 201.

It will be understood that each of the elements described above, or two or more together, may also find useful application in other types of shutter assemblies differing from the types described above in connection with FIGS. 1, 2-3 and 4-5. For example, the novel assembly utilizing separate driving means for moving the shutter blades into open and closed positions may be readily modified to bring about such movements of the blades simultaneously with the beginning of rotary motion of both driving members. All that is necessary is to modify the cam slots in the blade actuating shutter ring or rings with which the driving lugs are adapted to cooperate. Thus, and referring to FIG. 2, if the slots 103a, 111a are formed without arcuate outer portions, any movements of lugs 105a, 106a, respectively, will immediately cause rotation of rings 103 and 111 in clockwise or anticlockwise direction.

Without further analysis, the foregoing will so fully reveal the gist of the present invention that others can by applying current knowledge readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. In a camera shutter assembly, in combination: shutter blade means having an open and a closed position; at least one ring means connected with said blade means for moving the latter into said positions; first and second driving means; resilient actuating means for rotating each of said driving means; a first lug and slot connection between one of said driving means and said ring means for rotating the latter in a direction to move said blade means into open position; and a second lug and slot connection between the other driving means and said ring means for rotating the latter in a direction to move said blade means into closed position, the slot of each said connection comprising a radial portion, and the lug of each said connection entering radially into the radial portion of respective slot while tangentially engaging an edge thereof to bring about gradually accelerated and decelerated impact-free movements of said ring means in directions to open and close said blade means.

2. In a camera shutter assembly as recited in claim 1, said shutter blade means including a group of shutter blades having an open and a closed position, said ring means including a first shutter ring connected with each blade for moving the latter into open position and a second ring coaxial with said first ring and connected with each blade for moving the latter into closed position, said first driving means being operatively connected with said first ring for rotating same in a direction to move the blades into open position, and said second driving means being operatively connected with said second ring for rotating same in a direction to move the blades into closed position.

3. In a camera shutter assembly as recited in claim 1, the configuration of said slots in said connections being such that a time interval elapses between the time when the actuating means begin rotation of and accelerate said first and second driving means, and the time when the accelerated driving means begin rotation of the ring means over the lugs of said connections, whereby the time necessary for opening and closing of the blades is reduced.

4. In a camera shutter assembly as recited in claim 1, said shutter blade means including a group of shutter blades having an open and a closed position, said ring means including a first ring pivotably connected to said blades for moving same into open position and a second ring coaxial with said first ring and connected with said blades for moving same into closed position, said resilient actuating means including first resilient actuating means for rotating said first driving means, said first lug and slot connection cooperating with said first ring for rotating the latter in a direction to move the blades into open position, and said resilient actuating means also including second resilient actuating means for rotating said second driving means, said second lug and slot connection cooperating with said second ring for rotating the latter in a direction to move the blades into closed position, the configuration of slots in said connections being such that a time interval elapses between the time when the respective actuating means begin rotation of and accelerate said first and second driving means and the time when said accelerated driving means begin rotation of the respective rings, whereby the time necessary for opening and closing of said blades is reduced.

5. In a camera shutter assembly as recited in claim 1, said slot of each said connection comprising an arcuate portion in addition to said radial portion, and the lug of each said connection first moving in the arcuate portion of respective slot and entering the radial portion of respective slot in substantially tangential direction to bring about gradually accelerated and decelerated movements of said ring means in directions to open and close said blade means.

6. In a camera shutter assembly, in combination: a group of shutter blades having an open and a closed position; a shutter ring pivotably connected to each of said blades for moving the latter into said positions, said ring having a peripheral zone and a pair of spaced radial cutouts in said zone; first and second driving means; first and second resilient actuating means for rotating the respective driving means; a first lug connected to one of said driving means and adapted to enter one of said cutouts for rotating the ring in a direction to move the blades into open position; and a second lug connected to the other driving means and adapted to enter the other cutout for rotating the ring in a direction to move the blades into closed position, said lugs being spaced from the respective cutouts when the driving means are set in motion by the respective actuating means and entering radially into the respective cutouts at high angular speeds in substantially tangential impact-free engagement with the edges of said cutouts whereby to gradually increase the rotative speed of said ring in directions to move the blades into open and closed positions, respectively.

7. In a camera shutter assembly as recited in claim 1, said shutter blade means including a group of shutter blades having an open and a closed position, said ring means including a first ring pivotably mounting said blades for moving same into open position, said ring having a first closed slot comprising a radial portion and an arcuate portion, said ring means also including a second ring coaxial with said first ring and pivotably mounting said blades for moving same into closed position, said second ring having a second closed slot comprising a radial portion and an arcuate portion, said first driving means carrying a first lug extending into said first slot and forming therewith said first lug and slot connection, said second driving means carrying a second lug extending into said second slot and forming therewith said second lug and slot connection, said resilient actuating means including first resilient actuating means for rotating said first driving means in a direction to move the first lug from the arcuate into the radial portion of said first slot and second actuating means for rotating the second driving means in a direction to move the second lug from the arcuate into the radial portion of said second slot, the curvatures of paths in which said lugs are adapted to rotate with respective driving means corresponding to the curvatures of arcuate portions of said first and said second slot, respectively, whereby the lugs enter the radial portions of respective slots in substantialy tangential directions to gradually accelerate the respective rings in directions to move said blades into open and closed positions.

8. In a camera shutter assembly as recited in claim 7 the length of said arcuate portion of said second slot being less than the length of said arcuate portion of said first slot; lock means for arresting said first and second driving means in positions in which said first and second lug are in the arcuate portions of said first and said second slot, respectively; and means for simultaneously releasing said lock means to permit rotation of said driving means by respective actuating means, whereby the second lug enters the radial portion of said second slot and moves said blades into open position before the first lug enters the radial portion of said first to return said blades into closed position.

9. In a camera shutter assembly as recited in claim 1 lock means for releasably arresting said first and second driving means in a position in which the blade means is in closed position; and means for operating said lock means in such manner that said first and second driving means are released simultaneously.

10. In a camera shutter assembly as recited in claim 1 a release lever for releasably arresting said first and second driving means, said lever having a first position in which said driving means are arrested to maintain said blade means in closed position and a second position in which said driving means are released simultaneously to bring about opening and renewed closing of said blade means.

11. In a camera shutter assembly as recited in claim 1 each of said driving means being of substantially cylindrical contour and each having a peripheral zone defining a shoulder; and a release lever having a pair of spaced noses, the lever having a first position in which said noses abut against the shoulders of said first and second driving means, respectively, and a second position in which said noses are simultaneously moved away from abutment with respective shoulders.

12. In a camera shutter, in combination: shutter blade means having an open and a closed position; at least one ring means connected with said blade means for moving the latter into said position; first and second driving means; resilient actuating means for rotating said driving means; first operative connection means between one of said driving means and said ring means for providing impact-free initial contact therebetween and for rotating said ring means in a direction to move the blade means into open position; second operative connection means between the other driving means and said ring means for providing impact-free initial contact therebetween and for rotating said ring means in a direction to move the blade means into closed position, said first and second connections being such that a time interval elapses between the time when said actuating means begin a rotation of and accelerate the respective driving means, and the time when the accelerated driving means begin rotation of said ring means, whereby the time necessary for opening and closing of said blade means is reduced; and winding means for simultaneously tensioning said actuating means after each movement of said blade means first into open and thereupon back into closed position.

13. In a camera shutter assembly, in combination: shutter blade means having an open and a closed position; at least one ring means connected with said blade means for moving the latter into said positions; first and second driving means; resilient actuating means for rotating said driving means; first operative connection means between one of said driving means and said ring means for providing impact-free initial contact therebetween and for rotating said ring means in a direction to move the blade means into open position; second operative connection means between the other driving means and said ring means for providing impact-free initial contact therebetween and for rotating said ring means in a direction to move the blade means into closed position, said first and second connections being such that a time interval elapses between the time when said actuating means begin rotation of and accelerate the respective driving means, and the time when the accelerated driving means begin rotation of said ring means, whereby the time necessary for opening and closing of said blade means is reduced; and winding means comprising a gear segment for simultaneously tensioning said actuating means by rotating both said driving means in directions opposed to those in which the driving means are rotated by said actuating means to move the blade means into open and closed positions, respectively, the rotation of first and second driving means by said winding means being such that the blade means remain in closed position.

14. In a camera shutter assembly, in combination: shutter blade means having an open and a closed position; at least one ring means connected with said blade means for moving the latter into said positions; first and second driving means, resilient actuating means for rotating said driving means; first operative connection means between one of said driving means and said ring means for providing impact-free initial contact therebetween and for rotating said ring means in a direction to move the blade means into open position; second operative connection means between the other driving means and said ring means for providing impact-free initial contact therebetween and for rotating said ring means in a direction to move the blade means into closed position, said first and second connections being such that a time interval elapses between the time when said actuating means begin rotation of and accelerate the respective driving means, and the time when the accelerated driving means begin rotation of said ring means, whereby the time necessary for opening and closing of said blade means is reduced; and winding means for tensioning said actuating means by rotating both said driving means in directions opposed to those in which the driving means are rotated by said actuating means to move the blade means into open and closed positions, respectively, said winding means comprising a gear segment and a gear train between said segment and said first and second driving means.

15. In a camera shutter assembly, in combination: shutter blade means having an open and a closed position; at least one ring means connected with said blade means for moving the latter into said positions; first and second driving means; resilient actuating means for rotating said driving means; first operative connection means between one of said driving means and said ring means for providing impact-free initial contact therebetween and for rotating said ring means in a direction to move the blade means into open position; second operative connection means between the other driving means and said ring means for providing impact-free initial contact therebetween and for rotating said ring means in a direction to move the blade means into closed position, said first and second connections being such that a time interval elapses between the time when said actuating means begin rotation of and accelerate the respective driving means, and the time when the accelerated driving means begin rotation of said ring means, whereby the time necessary for opening and closing of said blade means is reduced; and winding means for tensioning said actuating means by rotating both said driving means in directions opposed to those in which the driving means are rotated by said actuating means to move the blade means into open and closed positions, respectively, said winding means comprising a gear segment, a gear train between said segment and said first and second driving means for rotating both said driving means at the same speed, and cam and follower means for selectively disconnecting one of said driving means from said gear train.

16. In a camera shutter assembly as recited in claim 1, a casing having an opening, said shutter blade means including a group of shutter blades pivotally connected to said casing and having a first position in which said opening is exposed and a second position in which said opening is covered, said ring means being coaxially and rotatably supported by said casing and operatively connected with said blades for moving same into said first and second positions when rotated with respect to said casing, said first and second driving means each having a shaft fixed to said casing, and said resilient actuating means including first and second resilient actuating means operatively connected to respective driving means for rotating the latter about respective shafts, the configuration of slots in said connections being such that a time interval elapses between the time when the first and second actuating means begin rotation of respective driving means and the time when the latter begin rotation of said ring means, whereby the driving means are accelerated by the respective actuating means before bringing about rotation of said ring means, and the time for exposing and covering of said opening is reduced; and winding means for tensioning said actuating means, said winding means comprising a gear segment pivotably fixed to said casing, a gear train comprising gears on the shafts of said first and second driving means and rotatable with respect to said driving means, means connected with said gears and with said first and second driving means, respectively for rotating said driving means in directions opposed to those in which the driving means are rotated by respective actuating means, said gear train being such that both said driving means are rotated by said segment at equal angular speeds whereby the blades remain in closed position, and said winding means further comprising means for arresting the rotation of one of said driving means by said segment while the other of said driving means is rotated.

17. In a camera shutter assembly, in combination, shutter blade means having an open and a closed position; ring means turnable about the axis thereof and operatively connected to said blade means for moving the latter between said positions thereof, said ring means having a pair of abutment faces extending transverse to the direction of movement thereof; first drive means for moving said blade means from said closed to said open position and second drive means for moving said blade means from said open to said closed position, each of said drive means including a drive lug and resilient means for moving said drive lugs along predetermined paths intersecting respectively with said abutment faces, said lugs being movable by said resilient means from a starting position spaced from said abutment faces into engagement with said abutment faces for turning said ring means, said abutment faces being arranged with respect to said paths with said abutment faces extending respectively in tangential direction to the direction of movement of the points of said lugs contacting said abutment faces during the first contact between lugs and abutment faces; and means for holding said lugs in their starting positions distant from said abutment faces and for releasing said lugs, respectively, in timed sequence for movement under the influence of said resilient means into contact with said abutment faces.

18. In a shutter, in combination, a rotary blade-operating shutter ring adapted to move blades of the shutter upon turning of said ring, said ring being formed with a radial notch extending inwardly from its outer periphery and having an open end at said outer periphery of said ring; a rotary member having an axis of rotation parallel to that of said ring and spaced from the turning axis of said ring by the same distance as said open end of said notch, said ring having a rest position where said open end of said notch is angularly displaced from said axis of rotation of said rotary member at a predetermined distance therefrom; and a motion-transmitting lug carried by said rotary member for rotary movement therewith and extending from said rotary member through the plane occupied by said ring, said lug being located at said predetermined distance from said axis of rotation of said rotary member so that during turning of the latter said lug, at the instant when it is located at said open end of said notch, will have only a direction of movement which extends radially with respect to the axis of said ring.

19. In a shutter as recited in claim 18, the edge of said notch, at said open end thereof, which is nearest to said axis of rotation of said rotary member when said ring is in said rest position thereof being spaced from said latter axis by the same distance as the part of said lug which is nearest to the latter axis when said lug is at said open end of said notch, so that said instant said lug and said ring at said open end of said notch thereof will contact each other without impact.

20. In a shutter as recited in claim 18, said rotary member having itself a rest position where said lug is located beyond and spaced from the outer periphery of said ring, and drive means cooperating with said rotary member to turn the latter in a direction which moves said lug to said open end of said notch, whereby said rotary member will freely accelerate before said lug reaches said open end of said notch.

References Cited in the file of this patent
UNITED STATES PATENTS

| | | |
|---|---|---|
| 798,595 | Brueck | Sept. 5, 1905 |
| 1,678,179 | Brueck | July 24, 1928 |
| 2,269,400 | Steiner | Jan. 6, 1942 |
| 2,463,206 | Robertson | Mar. 1, 1949 |
| 2,785,612 | Singer | Mar. 19, 1957 |
| 2,849,937 | Burger | Sept. 2, 1958 |